Jan. 8, 1952

T. O'C. McCARTHY 2,581,428

COMPASS CORRECTION SYSTEM

Filed July 11, 1949

2 SHEETS—SHEET 1

INVENTOR.
THOMAS O. Mc CARTHY
BY D. B. Snyder
Roderick B. Jones
ATTORNEYS

INVENTOR.
Thomas O. McCarthy
BY D. C. Snyder
Roderick B. Jones
ATTORNEYS

Patented Jan. 8, 1952

2,581,428

UNITED STATES PATENT OFFICE 2,581,428

COMPASS CORRECTION SYSTEM

Thomas O'Connell McCarthy, Pawling, N. Y.

Continuation of application Serial No. 535,529, May 13, 1944. This application July 11, 1949, Serial No. 104,122

24 Claims. (Cl. 33—224)

(Granted under the act of March 3, 1883, as amended April 30, 1928; 370 O. G. 757)

This invention relates to electrical systems for transmitting angular motion that include a transmitter unit and one or more repeater units.

This application is a continuation of my copending application entitled "Compass Correction System," Serial Number 535,529, filed May 13, 1944, abandoned.

A well-known type of such a system includes transmitter and repeater units which are usually alike and each comprises a single circuit field winding and a polycircuit armature winding, one of which constitutes a stationary element known as the stator and the other a movable element known as the rotor. The field windings of the transmitter and repeater are excited from a suitable source of alternating current and the respective armature windings are connected together.

These systems are used for many purposes and, under normal conditions, the repeater unit will follow the transmitter unit faithfully. In other words, motion of the transmitter through a 30° angle will cause the repeater to move through a 30° angle in the same direction, and so on.

In certain applications of angular-motion-transmission systems, it is desired not to have the repeater follow the transmitter degree for degree. For example, in a remote-reading compass system it is desirable to introduce a correction for the well-known compass errors. Likewise in direction-transmitting systems such as used in ordnance for target designation, the transmitted direction must be modified to allow for horizontal and for vertical parallax before the gun, range finder, or searchlight will point at the target being designated by the locator instrument. Similarly, in radio direction finders there exists an error that resembles a deviation error found in the compass art and that is, in fact, called a deviation error. This error can be corrected, compensated for, or removed so as to provide a direction indication that is approximately true. Many other installations incorporating direction-transmission systems are known wherein it is likewise desirable to provide a controllable asynchronous relation between the transmitter and repeater units.

The general object of this invention therefore is to provide a new and improved apparatus for effecting a controllable asynchronous relation between the transmitter and the one or more repeater units of an angular-motion-transmitting system.

Another object is to provide an apparatus of the type described wherein the amount of the asynchronism between the transmitter and repeater units varies as a function of the instant angular position of the transmitter unit.

A further object is to provide a new and improved electrical device for connection between the transmitter and repeater units of such a system wherein the normal synchronous relation existing between these units is made asynchronous by an amount that varies as a desired function of the instant angular position of the transmitter unit relative an external field.

Another object of this invention is to provide an improved and automatic electrical compensator for angular-motion-transmission systems that is much less costly than the present known mechanical compensators and that is also exceedingly simple in construction and operation. Furthermore, through simple adjustment means, the character of the compensation effected by the device can be altered over a very wide range to provide almost any action required.

Another object is to provide a new and improved apparatus that automatically compensates for the deviation error in remote-reading compass systems.

A further object of the invention is to provide a new and improved apparatus that automatically compensates for the deviation error in an earth-inductor-compass system.

A still further object of the invention is to provide a novel type of construction for a control transformer.

Another object is to provide a novel means of combining electrical and mechanical quantities.

These and other objects of the invention will become more apparent from the detailed description to follow and the accompanying drawings which show preferred embodiments of the invention in which Fig. 1 is a diagrammatic view of the invention as applied to a flux-gate earth-inductor-compass system;

Figures 1, 2, 3, 8:
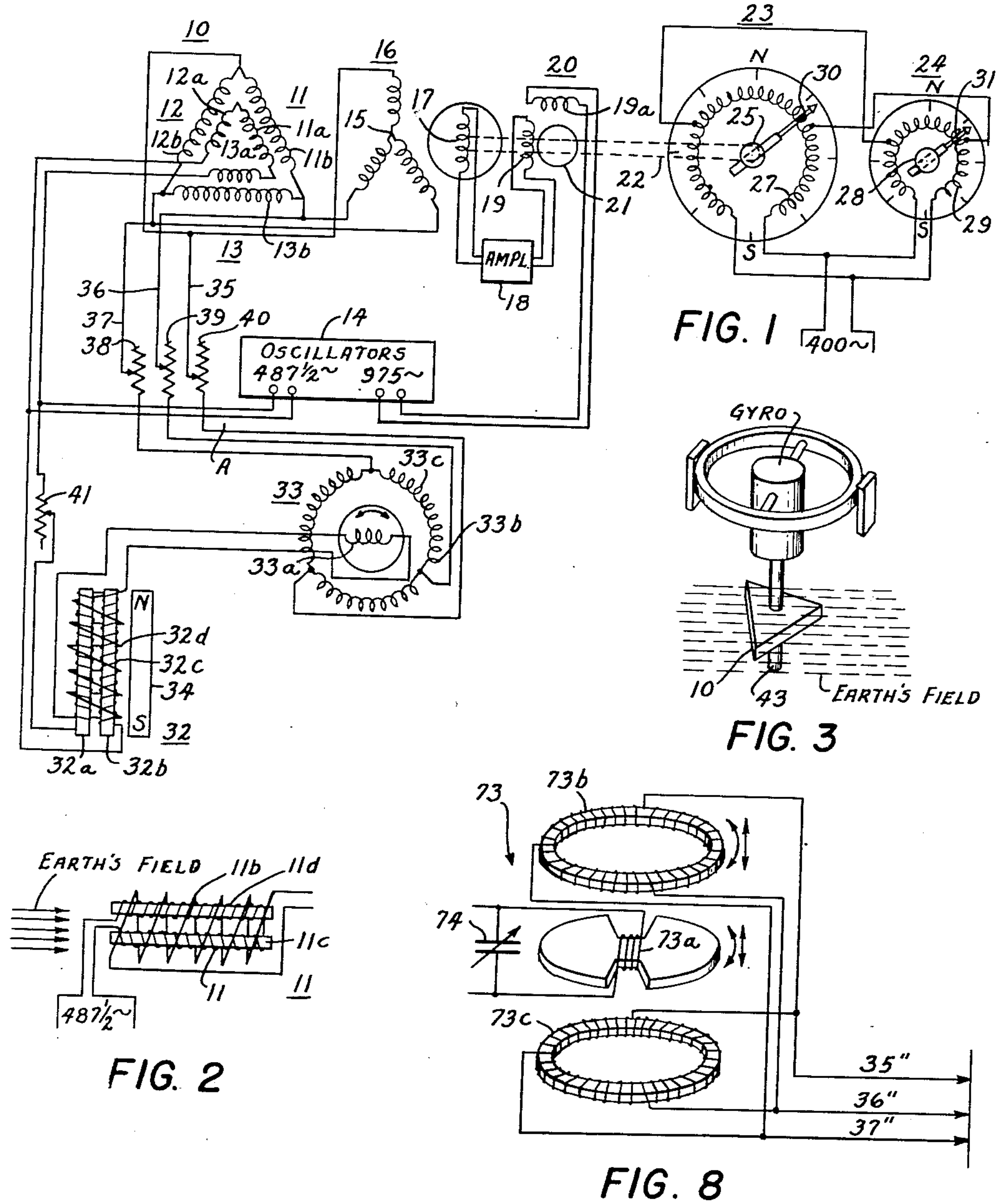
Fig. 2 is a view of the primary and secondary coil arrangement in one leg of the flux-gate.
Fig. 3 is a perspective view of the gyro-stabilized flux-gate.
Fig. 8 is a view showing a still further modified form of compensator.

In Figs. 1–3, inclusive, there is shown diagrammatically an earth-inductor-compass system according to this invention. A saturable core transformer, or flux-gate, indicated by numeral 10, consists of three legs, 11, 12 and 13, arranged to form an electrical equilateral triangle in space. All of these legs are of the same construction and each of them (see Fig. 2) such as leg 11 consists of a primary winding 11*a*, secondary winding 11*b*, and a pair of closely adjacent cores 11*c* and 11*d*.

As shown in Fig. 2, the primary winding 11*a* is divided, one half being wound on core 11*c* and the other half on core 11*d*. The two halves of the primary are wound in opposite directions and they are thus non-inductive. The primary winding 11*a* is excited from a source of alternating current which, in the present embodiment, has a frequency of 487½ cycles obtained from a suitable oscillator 14 of conventional design and therefore shown only in block diagram.

The primary windings 11*a*, 12*a* and 13*a* are designed to saturate their respective cores twice during each cycle, and for most of the cycle. During the saturation period there is, of course, no transformer action between the primaries and their associated secondaries. During each of the two unsaturated periods of the cycle, there is still no transformer action between the primary and secondary windings insofar as concerns the component of current in the primary from the 487½ cycle source because the two halves of each primary winding are wound in opposite directions. However, during each of the unsaturated periods, the earth's flux cuts through both halves of the core in the same direction and therefore induces a voltage in each secondary winding have a frequency of twice that of the primary, or 975 cycles.

As shown in Fig. 3, the three legs of flux-gate 10 may be enclosed in a casing which is mounted in gimbals and stabilized by a gyro in order to maintain it horizontal in the earth's field.

The amplitude of each of the three voltages induced in the secondaries 11*b*, 12*b* and 13*b* will of course depend on their instant position relative to the direction of the earth's field. These voltages will therefore vary with the instant heading of the aircraft, vessel or other carrier upon which the flux-gate is mounted. As the compass is rotated in the earth's flux, the three voltages will vary in a manner similar to the voltage variations caused by movement of the rotor in a conventional synchro system.

It should be pointed out that the magnitude of the induced voltages in these secondaries, which are delta connected, is very small, being of the order of a few microvolts. Hence, it is necessary to connect the output thereof to a Y-connected stator 15 of a coupling Autosyn 16. The rotor element 17 of this Autosyn is provided with a single-circuit winding and the voltage induced therein by the currents in its poly-circuit stator windings is amplified in amplifier 18, of conventional construction, and transmitted to the variable-phase winding 19 of the two-phase stator element of a low-inertia induction motor 20. The other phase winding 19*a* of the stator is connected to the 975 cycle A. C. output terminals on oscillator 14. Induction motor 20 has a squirrel-cage rotor 21.

Rotors 17 and 21 are mechanically coupled together by a shaft 22. Hence the voltages impressed upon the stator windings 19 and 19*a* of motor 20 will cause its rotor 21 and rotor 17 to rotate until the latter reaches its null position. Induction motor 20 is therefore a torque amplifier which turns rotor 17 to the position it would take were it able itself to develop the necessary torque.

From what has so far been described, it is seen that a change in angular position of the flux-gate 10 relative to the earth's field effects a like angular change in the position of rotors 17 and 21 and the shaft 22 connected therebetween. The flux-gate 10 is therefore analogous to the transmitter unit of a synchro or self-synchronous system and the motors 16 and 20 analogous to a repeater unit of such system.

For repeating the instant angular position of rotors 17 and 21, a second self-synchronous system is utilized and comprises a transmitter unit 23 and one or more repeater units 24.

The transmitter and repeater units are similar in structure, although the repeater would normally be smaller than the transmitter if the latter is to drive a number of repeater units.

The transmitter unit 23 includes a permanent-magnet rotor 25 coupled to shaft 22 and a stator including a circular, laminated core. The stator has an exciting coil 27 wound upon it with a lead tapped off at each 120° point, thus making four leads altogether: two input leads and two tapped leads. The constants of the transmitting unit (the number of turns, value of exciting current, and magnetic alloy selected for the stator core) are chosen so that the stator core will be completely saturated twice during, and for most of, each cycle of its supply source which has a frequency of 400 cycles. During periods of saturation, no inductive effect can be produced within the core by the exciting current or the permanent-magnet rotor. However, during each of the short unsaturated periods of the core, the rotor is free to produce an inductive effect upon it. During these periods, the rotor's magnetic flux flows through the core, and as it does so, induced voltages are superimposed in the stator winding. These voltages are at a frequency of 800 cycles since the stator core is rendered unsaturated for a short period twice during each cycle. The voltages across the taps of each of the three parts of the stator winding differ in value and vary with the instant position of the rotor 25 relative to stator winding 27.

As previously stated, the repeater unit 24 is similar to transmitter unit 23 and its rotor and stator winding are identified by reference numerals 28 and 29, respectively.

The stator windings 27 and 29 of the two units are connected in parallel and excited from the same 400 cycle A. C. source.

When the rotors of both units are in the same position relative to their respective stator windings, the three tapped voltages induced in the stator windings 27 and 29 will be alike. However, when the rotor 25 is rotated by shaft 22, the induced voltages in the stator winding 27 will differ from those in the stator winding 29 causing signal current to flow from winding 27 to winding 29 superimposed upon the excitation current. This flow of current produces a new resultant magnetic field flux in the stator winding 29 causing the rotor 28 of the repeater unit to rotate until it is in the same relative position to its stator winding 29 as the rotor 25 in the transmitter unit is to its staor winding 27. Accordingly, any angular displacement of rotor 25 by rotation of shaft 22 causes a like displacement of rotor 28.

It is now seen that as the bearing of the carrier for the flux-gate 10 changes relative to the earth's field, such bearing change will be fed electrically through the Autosyn coupling 16 and induction motor 20 producing an equal angular change in the position of shaft 22 and of the rotor 25 in the transmitter unit 23, which angular change may be indicated by a pointer 30. Transmitter unit 23 is then, in effect, a master compass. The position of pointer 30 may then be repeated by a pointer 31 on the rotor element of the one or more repeater units 24.

The earth-inductor-compass and all other types of compass systems depending upon the earth's magnetic flux for direct indications fail to indicate the true geographic north by the algebraic sum of the variation and deviation errors. Variation, which is the angle between the true or geographical and the magnetic meridian, is known for any given locality. The deviation is the total angle difference between the magnetic meridian and the indications of the compass system, and is caused by the magnetism of the vessel or other carrier upon which the compass system is carried.

Figures 5, 6, 7:
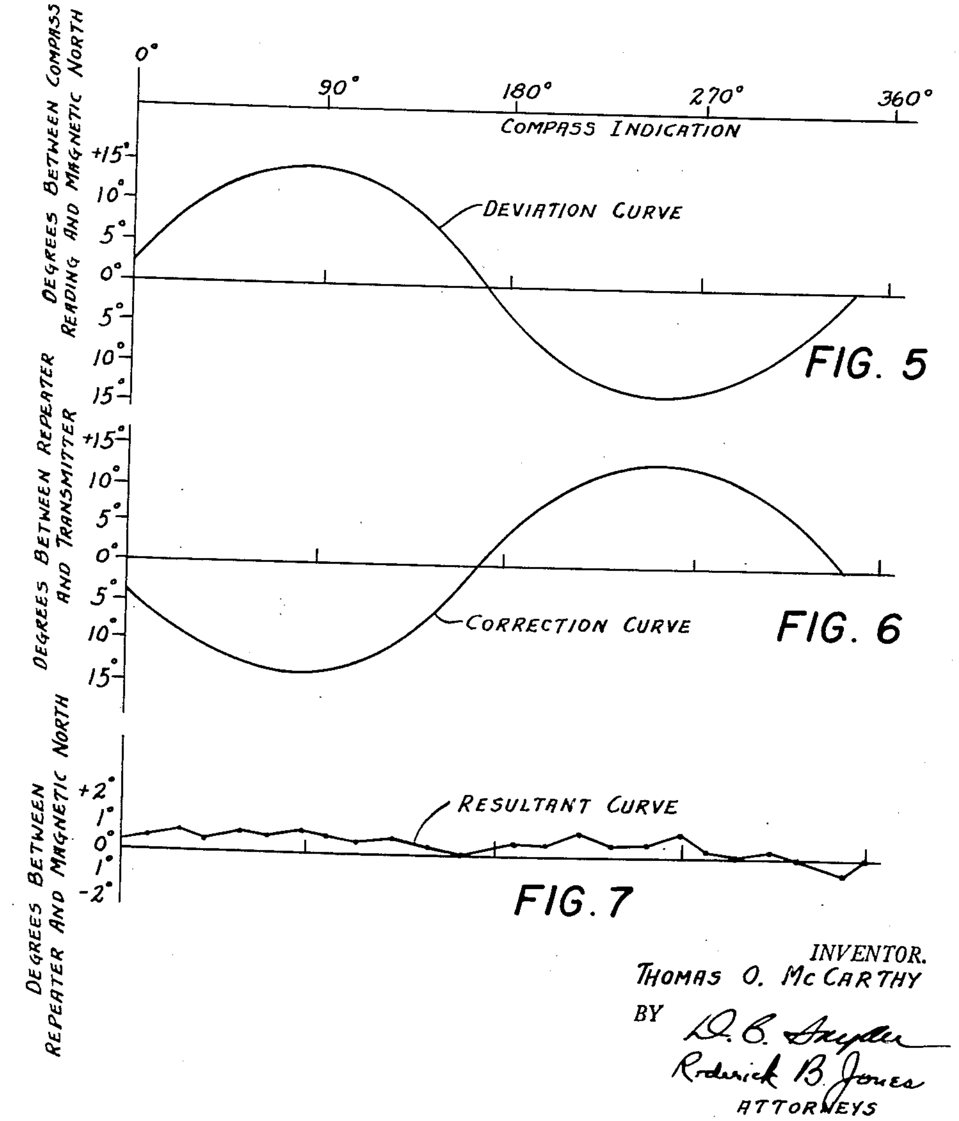
Figs. 5, 6 and 7 are plots of the deviation, correction and resultant curves for the apparatus in Fig. 1.

The remote-reading earth-inductor-compass system that has been described is exceedingly practical since the magnetically sensitive element (flux-gate 10) may be mounted so as to eliminate the effects of the unsymmetrical iron and steel of the compass carrier, such as are found in a vessel, and in a location where the effects of horizontal soft iron will be of a low value. When this condition is obtained, the deviation error is reduced to a factor, that when plotted as an ordinate against compass indication as an abcissa, results in a curve having sinusoidal characteristics. A typical such curve is shown in Fig. 5.

In the earth-inductor-compass that has been described, the bearing indication on the transmitter unit 23 would, if not compensated, be in error by the algebraic sum of the variation and deviation errors. In this invention no compensation for variation is contemplated because this component of the total error is a constant for any latitude in which the compass carrier may be. However, one way for compensating the variation error would be to provide some means for shifting the rotor 25 of the transmitter 23 relative to shaft 22.

However, this invention does provide an automatically operating and novel corrector or compensator which will substantially cancel out the deviation component of the total error.

Automatically operated deviation compensators presently known are of a mechanical nature and most costly and in no case do they alter the compensation to match the change in deviation error caused by displacement in magnetic latitude of the carrier. This invention substitutes an electrically operated compensator that is far more simple and less costly.

In particular, and with reference to Fig. 1, one form of my improved deviation compensator comprises a wave generator 32 and a control transformer device 33. The wave generator 32 consists of a flux-gate element which is similar to any of the three legs of device 10. That is, the generator 32 includes two cores 32*a* and 32*b* of a material having a high permeability with a primary winding 32*c* split between them, the two halves of this winding being wound on their respective cores in opposite directions so as to be non-inductive with respect to the secondary winding 32*d* which surrounds primary winding 32*c*.

Primary winding 32*c* is fed from the same 487½ cycle output terminals of oscillator 14 as the primary of flux-gate 10. However, wave generator 32 is designed to operate in the magnetic field of a permanent magnet 34, which is placed so as to provide a flux field of the proper intensity and direction. The earth's field is obviously also present in the cores 32*a* and 32*b* but its intensity, when compared to that of magnet 34, is so minute that it can be totally disregarded so far as operation of generator 32 is concerned.

Like flux-gate 10, the two cores 32*a* and 32*b* are saturated twice during, and for almost the entire period of, each cycle. However, during the two short periods in each cycle when cores 32*a*, 32*b* are unsaturated, the entry of the magnetic field from magnet 34 into these cores effects a transformer action to induce a voltage into the secondary 32*d*. The frequency of the voltage output from the secondary 32*d* will be twice that of the primary, or 975 cycles since the cores 32*a*, 32*b* are saturated twice during each cycle.

Transformer 33 includes a rotatable primary winding 33*a* and a core 33*b* which may be circular. A distributed secondary winding 33*c* is wound upon core 33*b* and tapped at the 120° points. The output from secondary winding 32*d* feeds the primary 33*a*. Consequently, when current flows in primary 33*a*, a voltage is induced in each of the three divisions of secondary 33*c* between the 120° tap points, the amplitude of each such voltage being dependent in part upon the particular angular position at which the rotatable primary winding 33*a* is set.

These three voltages, which are the correction voltages to compensate for the deviation error, are then connected into the electrical connections between the secondary windings 11*b*, 12*b*, 13*b* and stator windings 15 of the coupling Autosyn 16 by means of conductors 35, 36 and 37 and series-connected variable resistors 38, 39 and 40.

During the operation of the fluxgate system, a very complex flow of current exists between the secondaries of the fluxgate element 10 and the stator elements 15 of the coupling Autosyn 16. This current changes for every angular position of the fluxgate with respect to the earth's field. A part, at least, of the current flowing between the fluxgate element and stator element 15 is thought to circulate through the secondaries of the transformer 33, reacting, in turn, upon the primary of this transformer and causing the current flowing therein to vary in strength as the fluxgate element rotates in the earth's field. The output electromotive force of the transformer unit, accordingly, varies as a function of the angular displacement of the compass or earth inductor.

In the system shown in Fig. 1, the primary winding 32*c* of generator 32 is excited at one-half the frequency of the voltage outputs from secondary windings 11*b*, 12*b* and 13*b* of the flux-gate 10. As this frequency is doubled by wave generator 32, the correction voltages from transformer 33 will be at the same frequency as the output voltages from secondaries 11*b*, 12*b* and 13*b*. As the excitation for both flux-gate 10 and generator 32 is derived from the same source, oscillator 14, and transformer 33 is electrically coupled to generator 32, a predeterminable but controllable phase relationship exists between the deviation correction voltages and the output voltages from flux-gate 10.

It should now be apparent that if good compensation for the deviation component of the total compass error is to be obtained, correction voltages must be derived that, if applied to an earth-inductor-compass system without a compensator and located on a vessel or other carrier having no iron whatsoever, would produce a curve such as that shown in Fig. 6. Theoretically, this curve should be such that were it to be combined algebraically with the curve in Fig. 5, the net result would be zero error around the entire horizon. Although the theoretically desired curve is possible, it has been found in practice that a correction curve which only approximates the contour of the deviation curve and will therefore produce the resultant curve such as that shown in Fig. 7 is satisfactory. Such a curve can be obtained by varying the position of the primary 33a relative to the secondary 33c associated therewith and making such adjustments as may be necessary in the settings of resistors 38, 39 and 40 in circuit with the secondary winding of transformer 33, and resistor 41 in circuit with the primary of generator 32. The points at which the correction curve crosses the base line can be adjusted by shifting the position of primary winding 33a and the amplitude of the curve is adjusted through resistors 38–41, inclusive.

In other words, as the heading of the carrier on which the compass system is installed changes through 360°, the only error will be that shown in Fig. 7 which is within the inherent error of the compass system.

It should be noted that once the correct position for the primary 33a of transformer 33 relative to its secondary 33c is adjusted for any particular compass installation, it need not be disturbed because it will automatically produce the right amounts of correction voltages required at any instant bearing throughout the 360° range.

Figure 4:
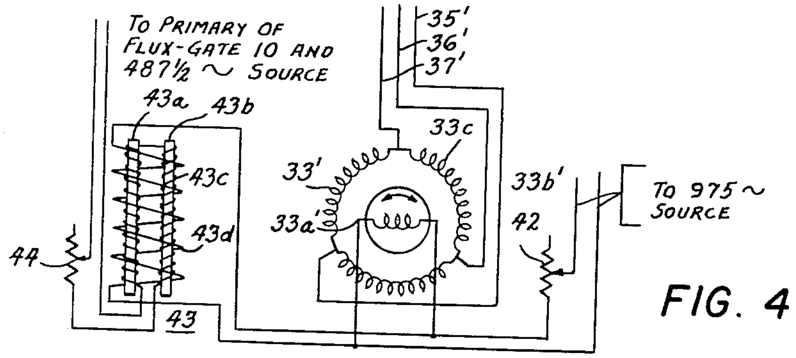
Fig. 4 is a diagrammatic view of a modified form of the electrical compensator shown in Fig. 1.

As an alternative arrangement for introducing the compensation necessary to offset the deviation component of the total compass error, reference is now made to Fig. 4. Transformer 33' in Fig. 4 is similar to transformer 33 shown in Fig. 1, containing a rotatably adjustable primary winding 33a', core 33b' and a distributed 120° tapped secondary winding 33c', the 120° spaced components of secondary 33c' being connected in delta. If desired, winding 33a' may be made axially adjustable in accordance with the transformer structure disclosed in Fig. 8. However, in lieu of the wave generator 32 utilized in the arrangement shown in Fig. 1, excitation for the primary winding 33a' is obtained by tapping on to the 975 cycle output terminals of oscillator 14. A variable resistor 42 can be used in the circuit between the primary 33a' and the 975 cycle source to obtain any adjustment in current that may be necessary. The three output conductors leading from the taps on the secondary winding 33c' feed into the electrical connections between flux-gate 10 and the stator windings 15 of coupling Autosyn 16 in the same manner as shown in the arrangement in Fig. 1. These conductors have accordingly been identified in Fig. 4 by reference numerals 35', 36' and 37'. Resistor units similar to resistors 38–40, inclusive, in Fig. 1 can also be included in circuit with the conductors 35'–37', inclusive, but these have not been shown.

Also included in Fig. 4 is a wave generator 43 which is essentially similar to any of the three legs of the flux-gate 10. That is, generator 43 includes two cores, 43a and 43b of a high permeability material with a primary winding 43c split between them, the two halves of this winding being wound on their respective cores in opposite directions so as to be non-inductive with respect to each other and to the secondary. The secondary winding 43d is wound around the primary winding 43c.

The primary winding 43c of wave generator 43 is excited from the same 487½ cycle source as the three primaries of flux-gate 10 and can include a variable resistor 44 for making any changes in primary current which may become necessary. A variable resistor can also be used in the secondary 43d if desired.

Wave generator 43, in one form of the invention, can be maintained at all times in a vertical position with reference to the carrier, such as a ship. There is no permanent-magnet device present in wave generator 43 and hence the voltage induced in the secondary 43d is caused solely by the earth's magnetic field as modified by the carrier. As the carrier moves in latitude, the vertical component of the earth's field varies and thus a varying output potential from secondary 43d is obtained. This output is then connected in parallel with the primary winding 33a' of transformer 33' along with the other, and fixed, 975 cycle source. The arrangement shown in Fig. 4 works in substantially the same manner as that shown in Fig. 1 which has already been described in detail. However, in addition to providing the necessary correction for deviation at any one latitude, which is the result obtained by the arrangement shown in Fig. 1, the arrangement in Fig. 4, in addition, will also compensate automatically for changes in the deviation characteristic of the ship caused by changes in latitude. It will be noted that the vertical generator 43 supplies in this instance the same type of correction provided by the Flinders bar used in the magnetic-compass art.

Alternatively, device 43 may be fixed vertically with reference to the earth as by stabilizing it with a gyro. If this arrangement is used, device 43 may be fixed to the same gyro as flux-gate 10 in a manner shown diagrammatically in Fig. 3. In this position, device 43 acts somewhat in the manner of a Flinders bar to correct for changes in the vertical component of the earth's magnetic field with changes in latitude and can also compensate part of the heeling error.

As a further alternative arrangement, the three component parts of the distributed secondary winding 33c' of transformer 33' may be Y-connected instead of connected in delta as shown in Fig. 4. Also, the fixed 975 cycle source may be the wave generator 32 of Fig. 1.

In an actual correction problem the curve of compass deviation such as shown in Fig. 5 may be obtained by any of the standard well-known methods for the particular ship in which the compass system is to be installed. With these data available it is a simple matter to make the necessary adjustments to the corrector circuits to remove the deviation from the system. The compass heading of the ship having been determined, from the curve, for (a) each null point and (b) the points of maximum amplitude, the ship is swung so as to be on the heading of a null, and the rotatable primary 33a or 33a' of the correcting transformer 33 or 33' is positioned so that there is no deviation in the compass system for this particular heading. The ship is then swung to the heading of a point of maximum deviation and the primary excitation of the corrector transformer is adjusted to remove all deviation; it will then be found that the deviation will have been removed or reduced to a small value for all headings of the ship. Should finer adjustment be desired a second swing of the ship can be made and the controls readjusted. Should the curve of compass variations be non-symmetrical, it may be necessary to adjust the resistances in the secondary leads from the corrector transformer, and/or impedance in the primary excitation circuit.

In a system including vertical wave generator 43, the relative amounts of voltage supplied by that generator and by the fixed source will be adjusted in such a manner that the proper change in total effect will be achieved for a certain change in magnetic latitude. This can be accomplished by making actual settings in the two different latitudes, or by artificial means approximating such changes.

Many ships encounter the necessity for compensating the compass under two widely different conditions. Examples are found in the use of degaussing coils, and in the loaded and unloaded state of a ship carrying a magnetic cargo, e. g., tanks. For such installations, I contemplate providing two separate compensating systems selected by a suitable switching arrangement.

In some applications of this invention, it may be desirable to obtain greater flexibility in generating curves than that offered by the single transformers 33 or 33' shown in Figs. 1 and 4, respectively. For example, it may be desirable to compound two curves of varying amplitude and frequency. This increased flexibility can be obtained by the arrangement shown diagrammatically in Fig. 8 wherein the correction transformer comprises a primary winding **73*a* and a pair of secondary windings 73*b*, 73*c*. Primary winding 73*a* corresponds with primary 33*a* of transformer 33 and is so supplied that it can be rotatably adjusted in either direction and also vertically adjusted either up or down. The secondary windings 73*b* and 73*c* are similar in construction to the secondary winding 33*c* of transformer 33 except that one of them, 73*b*, is supported for rotation in either direction and also vertically adjustable, the other winding 73*c* being fixed in a given position. The three output leads at the 120° tapped points on the secondary windings 73*b* and 73*c* are connected in parallel and, for the compass application of the invention as shown in Fig. 1, would feed over conductors 35, 36 and 37 to the stator winding 15 of coupling Autosyn 16**.

It is evident that the arrangement shown in Fig. 8 could be applied equally as well to any other self-synchronous transmission system and in such case conductors 35, 36 and 37 would be tapped into the connections between the armature windings of the transmitter and repeater units of the system. The secondary windings **73*b* and 73*c*** may be either connected Y or delta.

Another means of controlling the shape of the correction curve would be to utilize phase shifting devices in the primary circuit of the correction transformers such as the variable capaciter 74 shown in Fig. 8.

The correction transformer herein described is claimed in my copending application, Serial No. 69,546, filed January 6, 1949, and entitled "Motion Transmission System."

Although the foregoing illustrations of the invention represent preferred embodiments thereof, various changes can be made therein by those skilled in the art without departing from the spirit and scope of the invention as defined in the appended claims.

The invention described herein may be manufactured and used by or for the Government of the United States of America for governmental purposes without the payment of any royalties thereon or therefor.

Having thus fully described my invention, I claim:

1. A system for transmission of angular motion comprising a transmitting device, a repeating device having a field element and connected to receive voltages from said transmitting device, and means for modifying the voltages impressed upon the field element of said repeating device from said transmitting device in accordance with the instant angular position of said transmitting device, said voltage-modifying means comprising a transformer, the primary and secondary of which are movable relative to each other, and adjustable impedance means combining the secondary voltage output with the voltage output from said transmitting device.

2. The system as in claim 1 wherein said voltage-modifying means is connected in shunt across said conductive connections.

3. In a telemetric system a transmitter and a receiver, said transmitter having an element movable relative to an external reference, said receiver having a movable member and a stationary winding, conductors interconnecting said transmitter and said receiver whereby relative movement of said transmitter element is effective to cause movement of the movable member of said receiver, and means interposed in said conductors for effecting asynchronous operation between said transmitter and said receiver, said last-named means comprising a rotary transformer having a stator, and variable impedance means connecting said stator across said conductors.

4. In a telemetric system a transmitter and a receiver, said transmitter having an element movable relative to an external reference, said receiver having a rotatable member and a stationary winding, conductors interconnecting said transmitter and said receiver, whereby relative movement of said transmitter element is effective normally to cause movement of the rotatable member of said receiver in sychronism with said transmitter element, a transformer, and variable resistance means coupling said transformer to said conductors for effecting asynchronous operation between said transmitter element and said receiver member.

5. An earth-inductor-compass system comprising, earth-induction means for deriving from the horizontal component of the earth's magnetic field a first electromotive force which is variable in accordance with the amount and direction that said induction means are displaced in azimuth relative to the direction of the earth's magnetic field, means for producing a correction electromotive force which is variable as a function of the angular displacement of said induction means in order to correct for the distortion of the earth's magnetic field caused by the magnetic qualities of the craft upon which the system is mounted, electrically operated indicator means for indicating the direction of the earth's field, and means for applying both said first and correction electromotive forces to said indicator means whereby the latter will indicate substantially the true direction of the earth's field.

6. An earth-inductor-compass system comprising earth-induction means for deriving from the horizontal component of the earth's magnetic field an electromotive force varying in accordance with the amount and direction that said induction means are displaced in azimuth relative to the direction of the earth's magnetic field, electrically operated indicator means for indicating the angular displacement of said induction means, electrical connections between said induction and indicator means, and means for providing a second electromotive force for modifying the electromotive force produced by said induction means as a function of the angular displacement of said induction means.

7. An earth-inductor-compass system comprising earth-induction means for deriving from the horizontal component of the earth's magnetic field an electromotive force varying in accordance with the amount and direction that said induction means are displaced in azimuth relative to the direction of the earth's magnetic field, electrically operated indicator means for indicating the angular displacement of said induction means, electrical connections between said induction and indicator means, and means for modifying the electromotive force produced by said induction means, last said means including inductive means responsive to the vertical component of the ambient magnetic field for producing therefrom an electromotive force automatically variable with variation in magnitude of the vertical component of the earth's magnetic field.

8. An earth-inductor-compass system comprising a polycircuit earth induction means having primary and secondary windings for deriving from the horizontal component of the earth's magnetic field electromotive forces varying in accordance with the amount and direction that said induction means are displaced in azimuth relative to the direction of the earth's magnetic field, polycircuit electrical indicator means for indicating the angular displacement of said induction means, electrical connections between said induction and indicator means, and means for modifying said electromotive forces, last said means comprising a transformer having a single circuit primary and a polycircuit secondary, means connecting the output from said polycircuit secondary of said transformer into said electrical connections, wave generating means responsive to an adjustable relatively strong undirectional magnetic field for producing an electromotive force alternating in synchronism with the varying electromotive forces derived from the secondary of said induction means, and means coupling said alternating electromotive force to said transformer primary.

9. A remote-reading compass system comprising, a compass means for producing an electromotive force varying in accordance with the amount and direction that the compass of said system is displaced in azimuth relative to the direction of the earth's magnetic field, indicator means operated by said varying electromotive force for indicating the angular displacement of said compass, and means for providing a second electromotive force for modifying said electromotive force as a function of the angular displacement of said compass.

10. An earth-inductor-compass system comprising, a fluxgate, electrical indicator means connected to the output of the secondary of said fluxgate for indicating the azimuthal position of said fluxgate, a source of alternating current for the primary of said fluxgate, a control transformer, means combining the output of the secondary of said control transformer with the output from the secondary of said fluxgate, and means for exciting the primary of said control transformer with alternating current synchronized with the alternating current exciting the primary of said fluxgate and at a frequency equal to the output frequency of said fluxgate.

11. An earth-inductor-compass system comprising, a fluxgate having a plurality of interconnected fluxgate legs, each leg having primary and secondary windings thereon, electrical indicator means connected to the output of the fluxgate secondary windings for indicating azimuthal position of said fluxgate, a control transformer having primary and secondary windings, a wave generator comprising a single fluxgate leg having a primary and secondary winding and operating in a relatively strong unidirectional magnetic field, means connecting the output from the secondary winding of said wave generator to the primary winding of said control transformer, means for supplying alternating current to the primary windings of said fluxgate and wave generator from a common source, and means connecting the output from the secondary winding of said control transformer in parallel with the output from the secondary windings of said fluxgate.

12. An earth-inductor-compass system comprising, a fluxgate having a plurality of interconnected fluxgate legs, each leg having primary and secondary windings thereon, electrical indicator means connected to the output of the fluxgate secondary windings for indicating azimuthal position of said fluxgate, a control transformer, an oscillator having a pair of outputs, one of said outputs being at a frequency double that of the other output, means connecting the lower frequency output to the primary windings of said fluxgate, means connecting the higher frequency output to the primary winding of said control transformer, and means connecting the secondary winding of said control transformer in parallel with the output of the fluxgate secondary windings.

13. An earth-inductor-compass system comprising, a fluxgate, electrical indicator means connected to the output of the secondary of said fluxgate for indicating the azimuthal position of said fluxgate, a source of alternating current for exciting the primary of said fluxgate, a control transformer, means combining the output of the secondary of said control transformer with the output from the secondary of said fluxgate, means for providing the primary of said control transformer with a first alternating current at a frequency double that of the alternating current exciting the primary of said fluxgate, and means for also providing the primary of said control transformer with a second alternating current at a frequency double that of the alternating current exciting the primary of said fluxgate, said second alternating current being variable with variation in magnitude of the vertical component of the earth's magnetic field.

14. An earth-inductor-compass system comprising, earth induction means including a plurality of saturable core type transformers for producing from the horizontal component of the earth's magnetic field electromotive forces varying in accordance with the amount and direction that said induction means are displaced in azimuth relative to the direction of the earth's magnetic field, a source of alternating current for exciting the primaries of said transformers, means interconnecting the secondaries of said transformers to provide a polycircuit electromotive force output, electrical indicator means including a polycircuit winding for indicating angular displacement of said induction means, electrical connections between the secondaries of said transformers and the polycircuit winding of said indicator means, and means for modifying the polycircuit output produced by said induction means as a function of the angular displacement of said induction means to compensate for deviation, last said means comprising a control transformer having a single circuit primary and a polycircuit secondary, means connecting the polycircuit output from the secondary of said control transformer into the connections between said induction and indicator means, and means for exciting the primary of said control transformer with an alternating current at a frequency double that of the current feeding the primary of said earth induction means.

15. An earth-inductor compass for use on a mobile craft comprising, an inductor element for generating a first alternating-current signal representative of the resultant of the earth's field and any extraneous permanent field, means for deriving at least one auxiliary signal synchronous with said first signal and equal in amplitude and opposite in phase to that of a component of said first signal due to said extraneous permanent field, and means for modifying said first signal by said auxiliary signal to develop a signal the phase of which is representative of the true bearing of the craft.

16. A remote-reading compass system comprising, means for producing a first electromotive force varying in accordance with the amount and direction that the compass of said system is displaced in azimuth relative to the direction of the earth's magnetic field, means for producing a correction electromotive force in order to correct for the distortion of the earth's magnetic field caused by the magnetic qualities of the craft upon which the system is mounted, electrically operated indicator means for indicating the direction of the earth's field, and means for applying both said first and correction electromotive forces to said indicator means whereby the latter will indicate substantially the true direction of the earth's field.

17. An earth-inductor compass for use on a mobile craft, comprising, an inductor element for generating a first alternating-current signal representative of the resultant of the earth's field and any extraneous permanent field, means for deriving at least one auxiliary signal synchronous with said first signal and equal in amplitude and opposite in phase to that of a component of said first signal due to said extraneous permanent field, and means for modifying said first signal by said auxiliary signal to develop a signal having an electrical characteristic which is representative of the true bearing of the craft.

18. An earth-inductor-compass system, comprising a multi-leg fluxgate, indicator means connected to said fluxgate for indicating the azimuthal position of said fluxgate, a source of alternating current for energizing said fluxgate, means including a control transformer having a plurality of generally angularly related secondary windings and a relatively movable primary winding and adapted to be energized with alternating current from said source, and means combining the output of the secondary windings of said control transformer with the output of angularly corresponding legs of said fluxgate.

19. The system as defined in claim 18 wherein said control transformer develops a correction voltage that is variable in accordance with variation of position of said fluxgate, and said combining means comprises a plurality of variable resistors.

20. The system as defined in claim 18 wherein one of said windings is adapted to be maintained in a predetermined fixed position relative to the other winding.

21. A system for transmission of angular motion comprising a transmitting device, a repeating device having a field element and connected to receive voltages from said transmitting device, and means for modifying the voltages impressed upon the field element of said repeating device from said transmitting device in accordance with the instant angular position of said transmitting device, said voltage-modifying means comprising a transformer having a primary and at least two secondaries movable relative to the primary, and means connecting the secondaries into the connections between said transmitting and repeating devices.

22. In a data-transmission system, a field-direction signalling device having means to generate a signal according to the instant position of said device relative to an external field, a repeater unit having field and armature elements, one of said elements constituting the rotor and said other element constituting the stator, means electrically connecting said signal-generating means to said armature element, whereby said rotor is normally positioned in accordance with the relative instant position of said device, means including a transformer having primary and secondary windings, one of said windings being coupled to said connecting means through adjustable impedance elements for applying a correction signal thereto, thereby to modify the signal impressed upon the armature element from said device as a function of said instant relative position.

23. The combination as in claim 22, further comprising means for independently adjusting said impedance elements thereby to alter the amplitude of said correction signal.

24. The combination as in claim 22, wherein the other of said transformer windings is connected to a source of alternating potential with adjustable impedance means in the circuit to said source for controllably adjusting the magnitude of the voltage impressed on said other winding.

THOMAS O'CONNELL McCARTHY.

REFERENCES CITED

The following references are of record in the file of this patent:

UNITED STATES PATENTS

| Number | Name | Date |
|---|---|---|
| Re. 21,970 | Bechberger | Dec. 9, 1941 |
| 1,215,815 | Kaminski et al. | Feb. 13, 1917 |
| 1,612,120 | Hildebrand | Dec. 28, 1926 |
| 1,774,459 | Tear | Aug. 26, 1930 |
| 1,814,842 | Murphy | July 14, 1931 |
| 1,840,911 | Minorsky | Jan. 12, 1932 |
| 1,909,815 | De Florez | May 16, 1933 |
| 2,241,499 | Barth | May 13, 1941 |
| 2,269,602 | Reichel | Jan. 13, 1942 |
| 2,283,712 | Welch | May 19, 1942 |
| 2,292,722 | Stiegler | Aug. 11, 1942 |
| 2,304,668 | Tyrner | Dec. 8, 1942 |
| 2,308,521 | Lear | Jan. 19, 1943 |
| 2,308,566 | Noxon | Jan. 19, 1943 |
| 2,459,830 | McCarthy | Jan. 25, 1949 |
| 2,464,057 | Phair | Mar. 8, 1949 |